W. J. HAWKINS.
THRESHING MACHINE.
APPLICATION FILED DEC. 3, 1908.
955,511.
Patented Apr. 19, 1910.
2 SHEETS—SHEET 2.
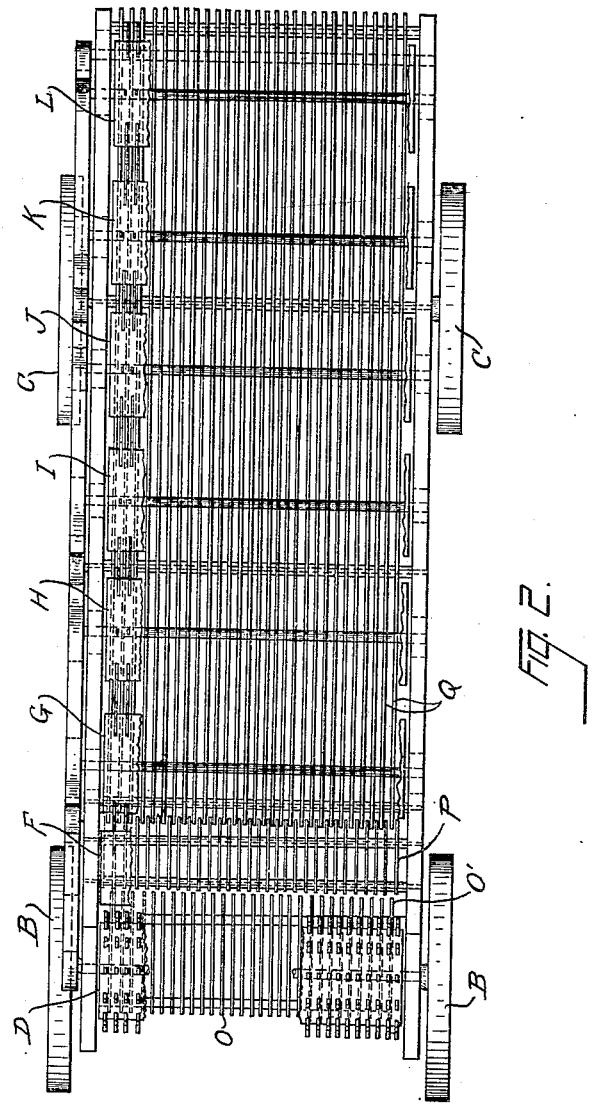
WITNESSES:
D. O. Drew.
C. A. Adams.
INVENTOR
William J. Hawkins;
By
Charles Turner Brown,
ATTORNEY

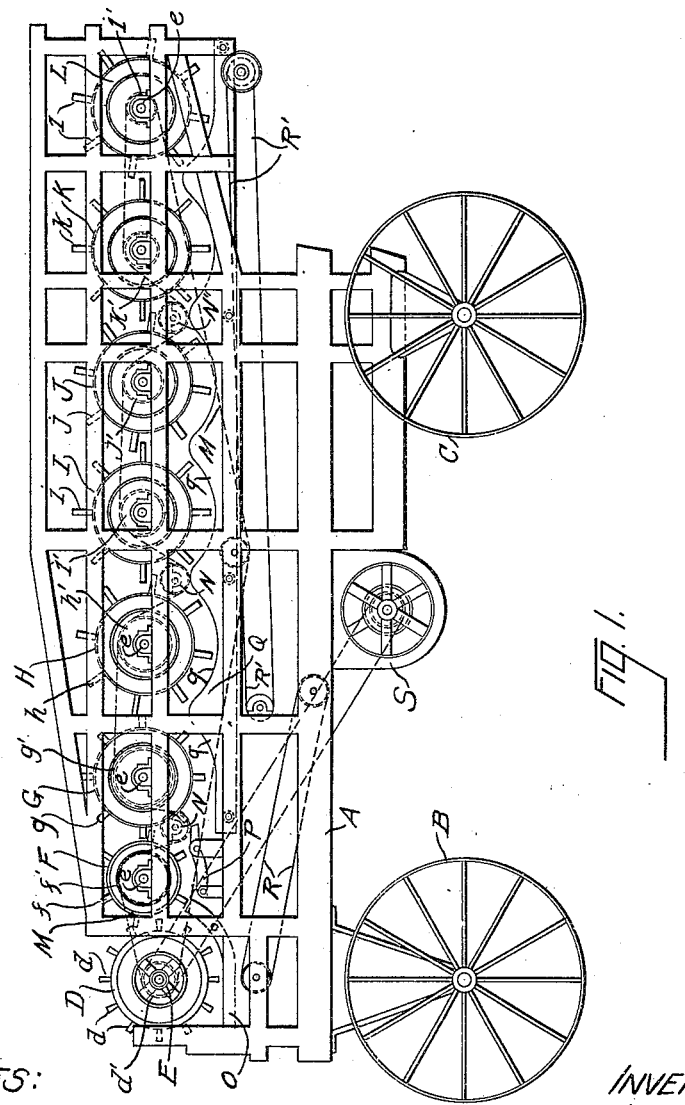

UNITED STATES PATENT OFFICE.

WILLIAM J. HAWKINS, OF ELGIN, ILLINOIS.

THRESHING-MACHINE.

955,511. Specification of Letters Patent. Patented Apr. 19, 1910.

Application filed December 3, 1908. Serial No. 465,842.

*To all whom it may concern:*

Be it known that I, WILLIAM J. HAWKINS, a citizen of the United States, and a resident of Elgin, in the county of Kane and State of Illinois, have invented certain new and useful Improvements in Threshing-Machines, of which the following, when taken in connection with the drawings accompanying and forming a part hereof, is a full and complete description, sufficient to enable those skilled in the art to which it pertains to understand, make, and use the same.

The invention relates to agricultural machines, used in threshing grain from straw.

The object of the invention is to obtain a device for threshing grain which will prevent any considerable quantity of grain being carried away in the straw discharged from the device.

A further object is to obtain a device from which straw will be conveyed without liability of clogging or choking while being so conveyed. And a further object is to obtain an economically constructed device, and one not liable to get out of order.

I have illustrated a device embodying my invention in the drawings referred to, in which—

Figure 1 is a side elevation thereof, and Fig. 2 a top plan view, with a portion of the cylinders thereof broken away to expose the parts thereunder to view.

A reference letter applied to designate a given part is used to indicate such part throughout the several figures of the drawing, wherever the same appears.

A is the frame of the device; and B, C, are the wheels supporting the frame and on which it may be transported from place to place.

D is a cylinder provided with pins or beaters $d, d$.

E, Fig. 1, is one of the journal bearings of the shaft of cylinder D.

F, G, H, I, J, K, and L, are respectively, cylinders rotatably mounted in bearings $e, e$. The cylinder F is provided with pins or beaters $f, f$, and $g, g, h, h, i, i, j, j, k, k$, and $l, l$, are pins or beaters on the cylinders designated by corresponding letters in capitals.

M is the belt or flexible chain by means of which the cylinders D, F, G, H, I, J, K, and L are rotated.

N, N', and N'' are idlers over which the belt or chain M is carried.

One of the primary objects of the invention is to present a device in which the straw will not clog or choke, and to obtain such result the driving wheel of cylinder G is of greater diameter than is the driving wheel of cylinder H; and the driving wheel of cylinder H is of greater diameter than the driving wheel of cylinder I; and the driving wheels of the respective cylinders J, K, and L, diminish, in like manner, in size; that of cylinder L being the least diameter.

$d'$ is the driving wheel of cylinder D, $f'$ is the driving wheel of cylinder F, and $g'$, $h'$, $i'$, $j'$, $k'$ and $l'$ are, respectively the driving wheels of cylinders G, H, I, J, K, and L. The driving wheel of cylinder D is of less diameter than the driving wheel of cylinder F and the driving wheel of cylinder F is of less diameter than the driving wheels of cylinders G, and I term said cylinders D and F, threshing and feeding cylinders, for the reason that in addition to their threshing or beating the grain they serve, as they move said grain forward, to retard it and crowd it on to the cylinder G, in such manner as to feed it continuously thereto. The grain supplied to the cylinder D is often fed thereinto by hand, and irregularly, but nevertheless, when cylinders D and F are constructed as and run at the differing rates of speed described, said grain may be fed at such short intervals that the cylinder G will receive a substantially continuous supply thereof from cylinder F. Cylinders G, H, I, J, K and L, beat the straw presented to them and in addition thereto separate said straw, that is each of said cylinders being located as shown and provided with the pins $g, h, i, j, k$, and $l$, which overlap or interlock, and arranged so that the cylinder to which grain is delivered moves more rapidly than the preceding (and delivering) cylinder, the straw is accelerated and separated thereby so presenting said straw to said cylinders that whatever grain remains therein is sure to be threshed therefrom. It is because of this action of said cylinders, and the fact that the grain is largely beaten or threshed from the straw before it is presented to them that I term said cylinders threshing and separating cylinders.

O, O, are grate bars underneath the cylinder D. Grate bars O, are curved upward at the delivery ends O′, thereof.

P, P, are grate bars underneath the cylinder F. Grate bars P are curved on their upper face, and the receiving ends thereof are in a lower plane than are the delivery ends of bars O.

Q, Q, are series of grate bars underneath the remaining cylinders of the device arranged to form separating devices. The receiving ends of the grate bars Q are lower than the delivery ends of the grate bars P, P, (see Fig. 1,) and such grate bars Q are provided with sinuous upper faces to correspond substantially with the peripheries of the circles in which the ends of the several beaters thereover move when the device is operated. The sinuous upper faces of the several grate bars Q are illustrated by the line $q$, Fig. 1.

R, R′ are aprons on to which grain which has been separated from the straw thereof, in the operation of the device, may fall through the several grate bars.

S is the discharge for grain.

In the operation of the device the several cylinders are rotated and the aprons are moved by the belts or flexible connections M and suitable belts on the driving wheels of the aprons. The rotation of all the cylinders is in the same direction, and the grain in the straw which is fed to the cylinder D is forced by the beaters $d, d$, on such cylinder down on to the grate bars O, O, and is then forced along such grate bars up and over the curved ends thereof to a point where such grain and straw are delivered to the cylinder F; by the beaters $f, f$, and by means of which they are forced down on to the grate bars P and along such grate bars to the delivery ends thereof, and discharged therefrom on to the receiving ends of the several bars Q, Q. Grain and straw which are separated at or prior to the delivery of the straw, (and the grain therein) on to the grate bars Q may take different courses, the grain falling through the grate bars on to the apron R thereunder. Grain and straw delivered to grate bars Q, Q, are moved along such grate bars by the respective beaters $g$, $h, i, j, k$, and $l$, the grain, as it is separated therefrom falling through the grate bars on to the apron R′ thereunder, and the straw moving at a constantly accelerated rate until delivered by the beaters $l, l$, from the end of such grate bars. The acceleration in the movement of the straw which is produced by the constantly increasing speed of the cylinders, as hereinbefore described, tends to thin out the layer of straw on the grate bars Q, Q, thereby preventing clogging or choking, and also giving a better opportunity for the grain which is separated from the straw to become disengaged therefrom to fall therethrough and through the grate bars on to the apron R′.

Having thus described the construction and operation of a machine embodying my invention, what I claim as new, and desire to secure by Letters Patent is:—

1. The combination of a series of threshing and feeding cylinders and a series of threshing and separating cylinders, both series consisting of a plurality of cylinders respectively provided with teeth, grates underneath said cylinders, said grates respectively consisting of plates the upper edges whereof are curved substantially parallel to the peripheries of the corresponding drums, means to rotate said cylinders continuously in the same direction and at different rates of speed, the threshing and feeding cylinders arranged so that a given one rotates more rapidly than the cylinder on the discharge side thereof, and the threshing and separating cylinders arranged so that a given one rotates more slowly than the cylinder on the discharge side thereof, the arrangement being such that grain is moved along the grates under a given threshing and feeding cylinder more slowly than under a preceding cylinder and is discharged from the last cylinder of said series to the first cylinder of the threshing series, and grain is moved along the grate under a given threshing and separating cylinder more rapidly than under a preceding cylinder; substantially as described.

2. The combination of a series of threshing and feeding cylinders and a series of threshing and separating cylinders, both series consisting of a plurality of cylinders respectively provided with teeth, grates underneath said cylinders, said grates respectively consisting of plates the upper edges whereof are curved substantially parallel to the peripheries of the corresponding drums, means to rotate said cylinders continuously in the same direction and at different rates of speed, the threshing and feeding cylinders arranged so that a given one rotates more rapidly than the cylinder on the discharge side thereof, and the threshing and separating cylinders arranged so a given one rotates more slowly than the cylinder on the discharge side thereof, the discharge end of a grate under a given threshing and feeding cylinder positioned in a higher plane than the receiving end of the grate next thereto and the grates under the threshing and separating cylinders substantially concentric with the cylinders thereover, the arrangement being such that grain is moved along the grates under a given threshing and feeding cylinder more slowly than under a preceding cylinder and is discharged from the last cylinder of said series to the first cylinder of the threshing series. and grain is moved along the grate under a given threshing and separating cylinder more rapidly than under a preceding cylinder; substantially as described.

WILLIAM J. HAWKINS.

In the presence of—
 FRANK SHERWOOD,
 C. B. HAZLEHURST.